(12) United States Patent
Kim et al.

(10) Patent No.: US 9,025,617 B2
(45) Date of Patent: May 5, 2015

(54) NETWORKING COEXISTENCE METHOD SYSTEM AND APPARATUS

(71) Applicant: Lantiq Beteiligungs-GmbH & Co. KG, Neubiberg (DE)

(72) Inventors: Joon Bae Kim, Lexington, NJ (US); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 120 days.

(21) Appl. No.: 13/624,969

(22) Filed: Sep. 24, 2012

(65) Prior Publication Data

US 2013/0077638 A1 Mar. 28, 2013

Related U.S. Application Data

(63) Continuation of application No. PCT/EP2011/001447, filed on Mar. 23, 2011.

(51) Int. Cl.
| | |
|---|---|
| *H04J 3/02* | (2006.01) |
| *H04L 12/413* | (2006.01) |
| *H04L 12/911* | (2013.01) |
| *H04B 3/54* | (2006.01) |
| *H04L 5/00* | (2006.01) |
| *H04L 12/28* | (2006.01) |
| *H04W 16/14* | (2009.01) |

(52) U.S. Cl.
CPC ............ *H04L 47/70* (2013.01); *H04B 3/542* (2013.01); *H04L 5/0066* (2013.01); *H04L 12/2838* (2013.01); *H04W 16/14* (2013.01); *H04L 5/0007* (2013.01); *H04L 2012/2841* (2013.01); *H04L 2012/2843* (2013.01)

(58) Field of Classification Search
CPC ................... H04W 74/0816; H04W 74/0825; H04W 74/08; H04J 3/00; H04J 3/245; H04J 3/1694; H04J 9/00; H04L 12/41; H04L 49/254; H04L 2012/5678; H04L 29/06163; H04Q 2213/13292; H04Q 11/04
USPC .................. 370/310–350, 442, 447, 461, 462
See application file for complete search history.

(56) References Cited

U.S. PATENT DOCUMENTS

| | | | |
|---|---|---|---|
| 6,807,222 B1 * | 10/2004 | Widdowson | 375/147 |
| 7,529,265 B1 * | 5/2009 | Nicholas | 370/445 |
| 2007/0242600 A1 * | 10/2007 | Li et al. | 370/210 |
| 2007/0291636 A1 | 12/2007 | Rajagopal et al. | |
| 2008/0205544 A1 * | 8/2008 | Berens | 375/285 |
| 2008/0225687 A1 * | 9/2008 | Oksman | 370/201 |
| 2008/0240021 A1 * | 10/2008 | Guo et al. | 370/328 |
| 2010/0029289 A1 | 2/2010 | Love et al. | |
| 2012/0189042 A1 * | 7/2012 | Varadarajan et al. | 375/222 |
| 2013/0301622 A1 * | 11/2013 | Bahl et al. | 370/336 |

FOREIGN PATENT DOCUMENTS

EP 1971039 A2 9/2008

* cited by examiner

*Primary Examiner* — Warner Wong

(57) ABSTRACT

An apparatus and method are provided for a network having a controller (102) and network devices (104) coupled thereto and having both wideband and narrowband signaling. The controller (102) determines one or more narrowbands in a frequency band associated with a wideband network and selects the narrowband(s) as silent bands where one or more network devices (104) are not to transmit wideband signals.

20 Claims, 2 Drawing Sheets

NETWORKING COEXISTENCE METHOD SYSTEM AND APPARATUS

The present invention relates to operation of a plurality of communication systems over a shared medium, such as a home network operation including one or several of wireline, wireless and powerline communication medium. One important problem that emerges these days is coexistence of different networking systems operating on the same medium.

In communication practice, there are cases of use of several independent data transmission and networking systems that may use same transmission technologies or different transmission technologies and that share the same transmission medium. Transmission media may, for example, be twisted pair wire, air such as in wireless communication or in optical communication, and coaxial cable. Since these different systems sharing the same medium are independent, each of them may transmit at any instance of time, which may result in collisions and retransmissions. Coexistence mechanisms are intended to solve this problem.

A goal of the implementations described herein is to resolve the coexistence issue for the case when transmission systems sharing a same transmission line use different modulation methods, in particular when no messaging between systems can be used since the transmission technologies are different at least with respect of messaging.

Consider an example where two or more networking systems use different individual transmission techniques, including those using different modulation methods. One possible way to provide coexistence is to define a common transmission technique that can be implemented by all systems (in addition to each networking system's respective individual transmission technique) and force all systems to use this technique and communicate between themselves to establish suitable media sharing. This principle is used in a transmission and messaging mechanism known as "Inter-System Protocol" (ISP). A system that implements ISP may obtain a share in the medium access and implement access procedures without being interfered by other systems.

The issue with such a proposed coexistence mechanism is that it may not be used by legacy systems, e.g., those systems that are already deployed or manufactured. Exemplary implementations described herein relate to a situation when a first installed legacy system uses a narrowband modulation, while a second new system uses wideband modulation, or vice versa.

The terms narrowband, wideband and broadband are used herein in accordance with typical understanding by a person skilled in the art. Thus, narrowband refers to a situation in radio communications where the bandwidth of the message does not significantly exceed the channel's coherence bandwidth, i.e., a range of frequencies over which in statistical measurement the channel could be considered "flat", or in other words the approximate maximum bandwidth or frequency interval over which two frequencies of a signal are likely to experience comparable or correlated amplitude fading. In contrast, the term wideband is typically understood to mean that the message bandwidth significantly exceeds the channel's coherence bandwidth, such as is the case in OFDM modulation. Finally, the term broadband refers to a signalling method that includes or handles a relatively wide range (or band) of frequencies, which for example may be divided into channels or frequency bins.

Another way of sharing the medium is using contention methods. In that case, every system monitors the medium to detect when the medium becomes free from competing systems, and then jumps in with its transmission. After one node starts transmission, other nodes respect this transmission and do not attempt transmission until this transmission is over. Once the transmission is finished, another node uses the medium for transmission. One of the well-known methods of this type is carrier-sense media access with collision avoidance (CSMA/CA).

According to another proposal, all coexisting systems use CSMA/CA access, and a common single narrow frequency band is used as a single carrier frequency for signalling to identify that the medium is busy. This method is generally not reliable since only one single carrier frequency is proposed. Furthermore, it is also impractical, because the deployed legacy systems are unable to accommodate the new functionality according to this proposal.

Another proposal prescribes to split the signal bandwidth into several sub-bands and assign each band for a particular type of system. This method is very inefficient for wideband modulation systems that perform better when applied over a wider band.

A further proposal uses the principle of notching, which eliminates the use any sub-carrier in a wideband transmission that is in a frequency range which is also used by a narrowband system. However, the notching mechanism is static and assumes a particularly configured narrowband system that shares a particular frequency band which is heavily regulated (for example, "CENELEC band A"). This method does not generally function when unknown technologies with narrowband modulation appear in unknown regions of the spectrum occupied by the wideband transmission.

The independent claims define the invention in various aspects. The dependent claims define embodiments according to the invention in the various aspects.

In a first aspect, the invention encompasses an apparatus suitable for use in a network. The apparatus has a controller and a plurality of network devices coupled to the controller. The apparatus is adapted to use both wideband and narrowband signalling. The controller is adapted to determine at least one narrowband in a frequency band associated with a wideband network. The controller is further adapted to select the at least one narrowband as silent band where the network devices are not to transmit wideband signals. At least one effect of the apparatus is to enable the node to concurrently engage in narrowband communication in a network and in wideband communication in another network, wherein the spectrum used for narrowband communication is allocated in the spectrum used for wideband communication.

In an embodiment of the apparatus according to the invention in the first aspect the network is a home network and the controller is a home gateway. In a particular embodiment, for example, the home network is compliant with the G·hn/nem standard.

In an embodiment of the apparatus according to the invention in the first aspect, the network devices are coupled to the controller by way of one or more of the following media: twisted pair, wireless, optical, coaxial cable or power line.

In an embodiment of the apparatus according to the invention in the first aspect, the controller is adapted to enforce silent periods by deriving a signal intended for one or more of the network devices that, with respect to wideband signals, indicates to reduce power spectral density (PSD) of spectra associated with the silent bands.

In an embodiment of the apparatus according to the invention in the first aspect, the network device is adapted to send a message to the controller to be interpreted as a request for a permission to use a silent band for narrowband transmission.

In an embodiment of the apparatus according to the invention in the first aspect, the network device is adapted to detect the narrowband signal. In an embodiment of the apparatus according to the invention in the first aspect, the network device is adapted to relay information indicative of any presence and/or absence of the narrowband signal for use in the controller. Thus, on the basis of such information, the controller can signal to suppress use of the respective narrowband within a wideband transmission.

In an embodiment of the apparatus according to the invention in the first aspect, a network device is adapted to detect a power of the narrowband signal and to relay information indicative of the detected power for use in the controller. Thus, on the basis of such information, the controller can signal to suppress use of the respective narrowband within a wideband transmission.

In an embodiment of the apparatus according to the invention in the first aspect, the controller is coupled to a plurality of networks and/or media. In an embodiment, the silent bands are allotted on a network sub-network/medium basis.

In an embodiment of the apparatus according to the invention in the first aspect, the controller is adapted to determine the silent band irrespective of any presence of narrowband transmission in the network. The controller may be further adapted to allow at least one of the network devices that are to transmit wideband signals to use the silent band when a narrowband transmission is not present thereon.

In an embodiment of the apparatus according to the invention in the first aspect, the controller is adapted to determine the narrowband on the basis of at least one of a group including the following:
  detecting noise levels;
  predetermined information; and
  information defined by the CENELEC protocol.

For example, the controller is adapted to determine the silent band based in accordance with a preprogrammed parameter setting.

In an embodiment of the apparatus according to the invention in the first aspect, the information is programmed into the network, for example, by a user or manufacturer.

In a second aspect, the invention encompasses a method for use in a network having a controller and at least one network device coupled to the controller. In particular, the network is adapted to use both wideband and narrowband signalling. The method includes determining at least one narrowband overlapping with a frequency band associated with a wideband network, and selecting the narrowband as silent band where one or more network devices are not to transmit wideband signals. At least one effect of the method is to enable the node to concurrently engage in narrowband communication in a network and in wideband communication in another network, wherein the spectrum used for narrowband communication is allocated in the spectrum used for wideband communication.

An embodiment of the method according to the invention in the second aspect, further comprises enforcing silent periods by deriving a signal for one or more of the network devices. The derived signal is indicative of a request to reduce power spectral density (PSD) of spectra associated with the silent band with respect to wideband signals.

An embodiment of the method according to the invention in the second aspect further comprises sending a message to the controller in order to request permission to use the silent band for narrowband transmission.

An embodiment of the method according to the invention in the second aspect further comprises detecting a narrowband signal and relaying information indicative of the detected narrowband signal to the controller.

An embodiment of the method according to the invention in the second aspect further comprises detecting a power of the narrowband signal.

In an embodiment of the method according to the invention in the second, determining the narrowband is based on at least one of
  reserving a silent band irrespective of any frequency edges of narrowband spectra used in the network at the time of determining the narrowband,
  detecting noise levels,
  programming information into the network by a user or manufacturer, and
  using information defined by the CENELEC protocol.

The implementations described herein propose that the new, next generation, wideband system(s) should accommodate the existing, narrowband legacy systems, or vice versa. For example, nodes of the new network, using wideband technology, detect the signals of the existing legacy systems and release the bandwidth for these systems to operate. The wideband system may also reserve a part of its spectrum when it expects a narrowband system to be installed into the network. Further, the wideband systems facilitate conditions that the narrowband system will land into the pre-assigned band. Explanation of the foregoing will be better understood with reference to detailed description.

DETAILED DESCRIPTION

In the following description a convenient model to describe the implementations described herein could be thought of as two networks connected to the same medium, a legacy network that uses narrowband modulation (hereinafter referred to as a "narrowband network") and a new generation network that uses wideband modulation (hereinafter referred to as a "wideband network"). The wideband network may include a network controller (also called "domain master" or domain controller) and a plurality of regular nodes. Of course, the instant application is not so limited to this network setup as it only illustrative of the basic framework in which the invention is to be applied.

Figure 1:
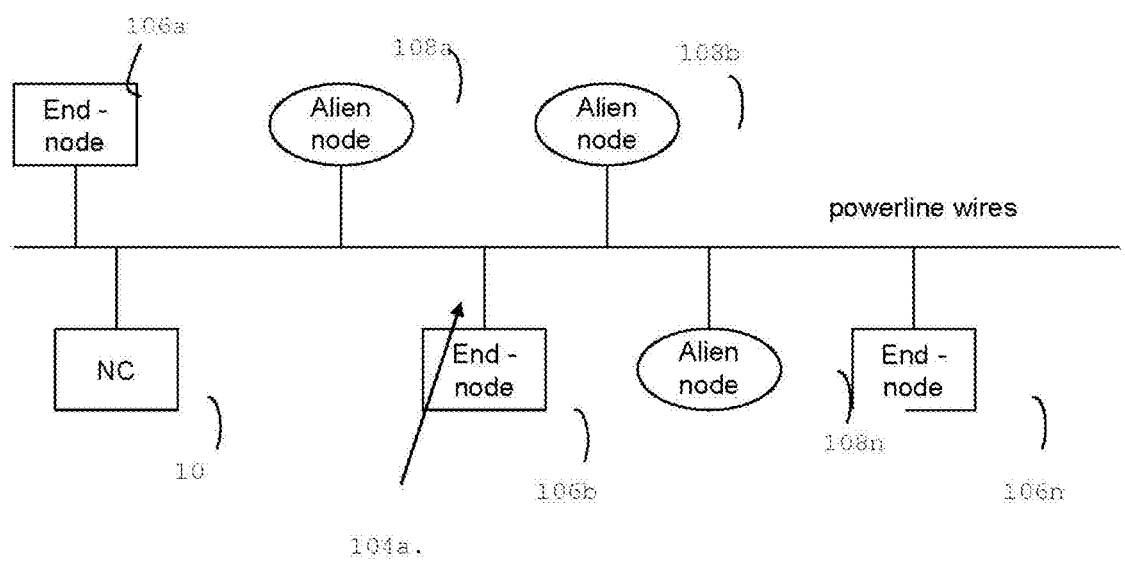
FIG. 1 illustrates a network relevant for the present invention.

A better understanding of the invention can be obtained with reference to FIG. 1 wherein there is shown a network 100 including a Network Controller (NC) 102 can instruct nodes 104a . . . n of the network which may include end nodes 106a . . . n and alien nodes 108a . . . n. Alien nodes 108a . . . n are nodes that are hidden to other nodes and/or the NC 102.

The NC 102, nodes 104a . . . n, end nodes 106a . . . n and alien nodes 108a . . . n may be multicarrier apparatuses and may communicate through a communication channel. The communication channel may be realized as a wireless communication medium, a wireline communication medium (e.g., coaxial cable, twisted pair of copper wires, power line wiring, optical fiber, etc.), or combinations thereof. The communication channel may be a shared medium like a bus structure or a private medium between each pair of multicarrier apparatuses. Accordingly, the multicarrier apparatuses may include structure and functionality that enable signal communication over such medium. Such structure and functionality may include one or more antennas, integrated wireline interfaces, and the like. Depending on the implementation, the multicarrier apparatuses may communicate with one another directly (peer-to-peer mode) or the multicarrier apparatuses may communicate via a master apparatus (e.g., NC 102).

The network may be connected through any type of physical medium such as twisted pair, wireless, optical, coaxial cable or powerline. In the example shown in the figure, the nodes may be connected over a powerline, that is, wiring in a structure that is suitable for carrying electricity for powering devices and electronics. Of course, the network can include any combination of these mediums that interconnect the various nodes. For example, printers may be connected using USB cables, laptops over wireless media, televisions and other entertainment devices over powerline or coaxial cable in the structure, or computer stations through twisted pair wiring.

The present invention may exist in one or more networks including networks defined or compliant with the following standards: xDSL (G.992.x, 993.x, etc.), 802.11 (WLAN), IEEE 802.16 (WiMAX), and ITU-T G.9960/G.9961 (G·hn/hnem), Homeplug, IEEE1901, GPON, or MOCA. The invention, in particular, may be applicable to a controller acting as a broadband access point (AP) or home gateway in a home networking system.

In practice, the NC 102 may instruct one or more nodes 104*a* . . . n how to operate using a certain set of transmission parameters. For example, the nodes could be instructed in a manner that reduces noise or improves transmission using modulation parameters. In general, the end nodes 106*a* . . . n follow all instructions communicated to them from the NC 102.

In one arrangement, the wideband network is installed on the same powerline wires that are used by one or more existing narrowband networks. In any case, when the first node (which may register itself as the NC 102) is installed, the NC 102 scans the valid frequency range for a sufficient time to recognize narrowband transmissions on different frequencies. As the NC 102 recognizes the narrowband transmissions, it formats the frequency ranges occupied by these narrowband signals to one or more silent bands. Narrowband signals may be identified by the NC 102 by their low-frequency and high-frequency edges.

The set of these silent frequencies is further broadcasted by the NC 102. Further the NC 102 should transmit the silent frequencies sufficiently in time and at intervals where a node 104*a* . . . n that joins the network will see the silent bands prior its first transmission. Thereafter, one, more or all of the nodes 104*a* . . . n will refrain to transmit in silent bands, providing coexistence between narrowband and wideband systems. The NC 102 can select a certain part of the band as the silent periods by reducing the power spectral density (PSD) with respect to the PSD for the wideband signals or by suppressing transmission on those spectra altogether.

In one aspect, if an end-node 106*a* . . . n that obtained the silent frequency range for the NC 102 recognizes that it is unable to detect any narrowband interference in particular silent band(s), it may send a message to the NC 102 for a permission to still use this silent band(s) for its own transmission. The NC 102 may then decide to allow or deny the request, thereby maintaining concurrence amongst the nodes 104*a* . . . n. This aspect, thus, provides special re-use of the frequency spectrum such that when, for example, certain silent periods that are not being currently utilized by narrow band signalling, the NC 102 may grant limited use of those spectra.

If the NC 102 does not detect any narrowband signal, it may use the whole spectrum and put no limitation on usage of the spectra. In certain cases, the narrowband signals may be detected at a remote node and relayed to the NC 102. The end-node 106*a* . . . n that joins the network, for example, prior to transmitting a signal, may search for narrowband networks and if detected, may identify silent bands in, for example, a registration request to the NC 102 to join the network. The end node 106*a* . . . n may also detect and forward the power of the detected narrowband signal or other relevant parameters of the narrowband signal in its registration request. The NC 102 will then direct the nodes 104*a* . . . n to avoid transmission in these detected bands.

In yet another aspect, the invention provides proper reception of the registration request signal. In this case, the joining node may also use frequency and time domain repetitions to compensate for bits that were not transmitted on the frequencies inside detected silent bands. After the NC 102 receives the report, it examines the reported parameters of the narrowband source and makes a determination as to which of these should be silent bands. The NC then transmits the silent band information to the nodes 104*a* . . . n of the network.

It is not necessary that all nodes in the domain should use the same silent bands. In another aspect, the invention actively manages different silent bands for different parts of the network. This may be for example, allotted on a network or sub-network basis. Alternatively, or in the aggregate, an implementation of the invention allocates different silent bands on a per medium basis, i.e., different silent bands on powerline as distinguished from the wireless, optical, cable or twisted pair communications.

Turning now to FIG. 1, there is illustrated the situation where a wideband network is first established and a narrowband network thereafter registers to be associated with the wideband network. In this case, silent bands are allocated and provided by the wideband network to accommodate the narrowband signals. In one aspect, the NC 102 may also practice silent band management in which it reserves silent bands for existing narrowband services and also for narrowband networks that it anticipates may join the network. For example, common endpoints, such as printers or televisions can be expected to be attached to a home network in a home networking system.

Figure 2:
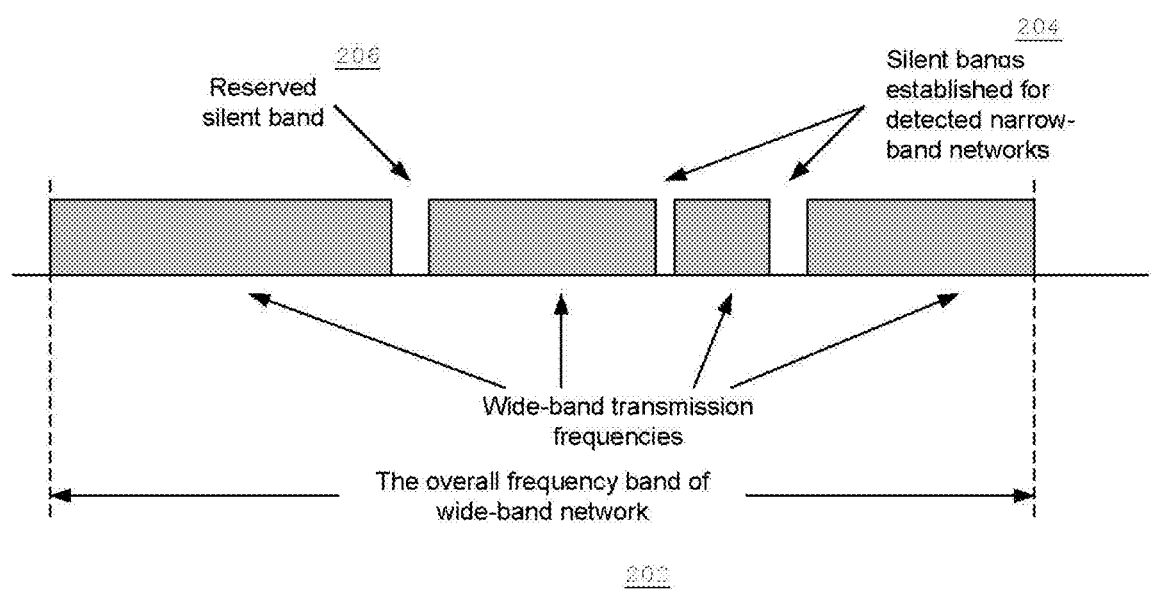
FIG. 2 illustrates a frequency bandplan according the present invention.

Thus, in FIG. 2 there is shown a frequency bandplan for a wideband network that has an overall wideband frequency band 202. In this case, silent bands 204 are allocated as explained with reference to FIG. 1. The exemplary system may alternatively or in addition thereto reserve silent bands 206 for future use.

Of course, implementations of the invention may take into account other situations and variations on this main theme. For example, there is accounted for the situation where the wideband network was created first, and later a narrowband network was installed by an independent user. It may be for example that a local controller exists for the later narrowband network that seeks to register for a first time. The local controller may act in the same way as the NC 102 explained above or as a relaying or router device for detecting and relaying the narrowband information.

In this case, the narrowband network according to this example actively searches for indications of narrowband signalling on its network. This may be done, for example, by a local controller or router. Thus, when turned on, the local controller searches for a part of the spectrum inside its valid spectrum range that is transmitting narrowband signals. In one aspect, this is achieved by detecting noise levels associated with the spectra. Where, for example, there is less noise than others, for better performance, the local controller may decide to select these signals for the silent bands.

According to this methodology, the network may be aware in advance of predetermined narrow band spectra. This may be programmed into the network by a user or manufacturer. For example, if the wideband network is aware about the frequency range of the narrowband network, it can reserve a certain part of the band with reduced power spectral density (PSD) or no transmission at all, so the narrowband network may utilize this reserved bandwidth.

For that matter, the nodes 104a . . . n themselves may be instructive in identifying the narrowband signals. For example, if the user of the wideband system is not reserving any bandwidth for expected narrowband system, all nodes of the wideband system may monitor for a new narrowband system appearing in its visibility range and report to the NC 102 about the frequency range of the detected narrowband network signals. The nodes may also detect and forward the level of the received PSD in order for the NC 102 or local controller to determine the narrow band signals as explained above.

In another aspect, the node 104a . . . n that detects and forwards the detected the narrowband source restricts itself or is restricted by the local controller to use the sub-carriers in the detected band until the NC 102 or local controller announces (i.e., through an appropriate signalling).

For more efficient detection of narrowband signals, it may be the case where the NC 102 expects a narrowband network or device to join but does not have a pre-indication on which spectra the narrowband signals may reside. In that case, the NC 102 may assign special silence periods, when one or more nodes 104.n in the network are not allowed to transmit, irrespective of the actual narrowband frequency. Thus, it is later intended to detect the neighbouring narrowband networks and assign the narrowband frequencies to those silent periods.

While the term "narrowband" has been used in the context of the present invention and implementations thereof, within the framework of this description this definition refers to systems which frequency band is much narrower than the frequency band of the wideband network. The skilled person in the field will recognize that, although not limiting the width of the band by specific values, the actual spectra will be determined according to the actual implementation. For example, what is determined as narrowband may depend on the transmission protocol of a particular network or medium. For example, in wireless networks the narrowband will be different than for optics or for twisted pair. For that matter, redundancy or other local network parameters may be used to determine the edges of the narrowband spectra and the width of the silent bands can be determined therefrom.

In a particular application, the invention and its several aspects may be applied to networks typical of certain geographical regions. For example, regions such as Asia, Europe and North America accord to certain protocols that specify or at least indicate the edges of the narrowband signals. One example of this regional type of transmission is defined in the CENELEC standard (EN-500065) currently used in Europe. Within this regime, a particular signal is used to indicate that the bandwidth is busy. The wideband network, after one or more of its nodes detects the busy signal may define the associated band as a silent band.

With the present invention there is, thus, provided a mechanism and method for preventing collisions with the narrowband network and, in particular, with systems incorporating both wideband and narrowband networks.

The invention claimed is:
1. An apparatus, comprising:
a controller; and
one or more network devices that are not capable of transmitting wideband signals and that are coupled to the controller via a medium,
one or more network devices that are capable of transmitting wideband signals and that are coupled to the controller via the medium, wherein
the controller is adapted to determine at least one narrowband in a frequency band associated with a wideband network transmitting via the medium;
the controller is further adapted to select, depending on the determined at least one narrowband, the at least one narrowband as a silent band,
the one or more network devices that are not capable of transmitting wideband signals are adapted to use the silent band;
the one or more network devices that are capable of transmitting wideband signals are adapted to not use the silent band;
the controller is further adapted to send a control message to at least one of the one or more network devices that are capable of transmitting wideband signals via the medium, the control message indicating the at least one narrowband.

2. The apparatus according to claim 1, wherein the network is a home network and the controller is a home gateway.

3. The apparatus according to claim 1, wherein the network devices are coupled to the controller by way of one or more of the following media: twisted pair, wireless, optical, coaxial cable or powerline.

4. The apparatus according to claim 1, wherein the controller is adapted to enforce silent periods by deriving a signal intended for one or more of the network devices that, with respect to wideband signals, indicates to reduce power spectral density (PSD) of spectra associated with the silent bands.

5. The apparatus according to claim 1, wherein the network device is adapted to send a message to the controller to be interpreted as a request for a permission to use a silent band for narrowband transmission.

6. The apparatus according to claim 1, wherein the network device is adapted to detect the narrowband signal and to relay information indicative of any presence and/or absence of the narrowband signal for use in the controller.

7. The apparatus according to claim 1, wherein a network device is adapted to detect the power of the narrowband signal and to relay information indicative of the detected power for use in the controller.

8. The apparatus according to claim 1, wherein the controller is adapted to determine the silent band irrespective of any presence of narrowband transmission in the network, and wherein the controller is adapted to allow at least one of the network devices that are to transmit wideband signals to use the silent band when a narrowband transmission is not present thereon.

9. The apparatus according to claim 1, wherein the controller determines the narrowband on the basis of at least one of a group including the following:
detecting noise levels;
predetermined information; and
information defined by the CENELEC protocol.

10. A method for a network having a controller and network devices coupled to the controller via a medium, the network being adapted to use both wideband and narrowband signaling, the method comprising:
determining at least one narrowband overlapping with a frequency band associated with a wideband network;
based on said determining of the at least one narrowband, selecting the narrowband as a silent band;
sending a control message to at least one of the network devices via the medium, the control message indicating the at least one narrowband;

one or more of the network devices that are capable of transmitting wideband signals not using the at least one silent band; and one or more of the network devices that are not capable of transmitting the wideband signal using the at least one silent band.

11. The method according to claim 10, the method further comprising enforcing silent periods by deriving a signal for one or more of the network devices indicative of a request to reduce power spectral density (PSD) of spectra associated with the silent band with respect to wideband signals.

12. The method according to claim 10, the method further comprising sending a message to the controller for a permission to use silent band(s) for narrowband transmission.

13. The method according to claim 10, the method further comprising detecting a narrowband signal and relaying information indicative of the detected narrowband signal to the controller.

14. The method according to claim 10, further comprising detecting a power of the narrowband signal.

15. The method according to claim 10, further wherein determining the narrowband is based on at least one of
reserving a silent band irrespective of any frequency edges of narrowband spectra used in the network at the time of determining the narrowband;
detecting noise levels programming information into the network by a user or manufacturer;
using information defined by the CENELEC protocol.

16. An apparatus, comprising:
a controller; and
a plurality of network devices coupled to the controller, wherein the controller is adapted to determine at least one narrowband in a frequency band associated with a wideband network; and the controller is further adapted to select the at least one narrowband as a silent band, irrespective of an actual narrow band signal residing at the selected silent band, the silent band for use by one or more network devices that are not to transmit wideband signals.

17. The apparatus according to claim 16, wherein the controller is adapted to enforce silent periods by deriving a signal intended for one or more of the network devices that, with respect to wideband signals, indicates to reduce power spectral density (PSD) of spectra associated with the silent bands.

18. The apparatus according to claim 16, wherein the network device is adapted to send a message to the controller to be interpreted as a request for a permission to use a silent band for narrowband transmission.

19. The apparatus according to claim 16, wherein the network device is adapted to detect the narrowband signal and to relay information indicative of any presence and/or absence of the narrowband signal for use in the controller.

20. The apparatus according to claim 16, wherein the controller is adapted to determine the silent band irrespective of any presence of narrowband transmission in the network, and wherein the controller is adapted to allow at least one of the network devices that are to transmit wideband signals to use the silent band when a narrowband transmission is not present thereon.

* * * * *